United States Patent Office 3,166,562
Patented Jan. 19, 1965

3,166,562
NOVEL NICOTINIC ACID PHENYL-ETHYLAMIDES AND PROCESS FOR PREPARING THEM
Heinrich Leditschke, Leopold Ther, and Gerhard Vogel, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 4, 1962, Ser. No. 242,104
Claims priority, application Germany, Dec. 6, 1961, F 35,483
4 Claims. (Cl. 260—295.5)

The present invention provides substituted nicotinic acid-phenyl-ethylamides of the general formula

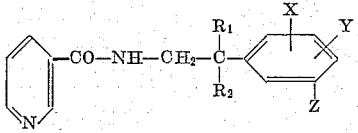

in which $R_1$ and $R_2$ each represent an alkyl radical containing 1–4 carbon atoms, and X, Y, and Z each represent an alkoxy radical containing 1–4 carbon atoms, chlorine or hydrogen, or two of these radicals represent together low molecular alkylene dioxy, and in which at least one of the radicals X, Y, and Z represents an alkoxy radical or a chlorine atom. The compounds of the above formula are valuable medicaments which are distinguished by good tranquilizing properties.

The present invention also provides pharmaceutical preparations which contain the nicotinic acid-phenyl-ethylamides of the above formula and the usual pharmaceutical auxiliaries, carriers, and/or stabilizers.

The present invention furthermore provides the preparation of such nicotinic acid-phenyl-ethylamides according to processes which are generally used for synthetizing such nicotinic acid amides. A preferred method according to the invention for preparing the new nicotinic acid amides consists, for example, in reacting nicotinic acid or a functional acid derivative of this acid or a hydrohalic salt of one of these compounds with a substituted phenyl-ethylamine of the general formula

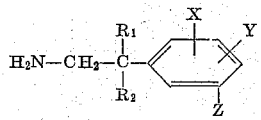

in which $R_1$ and $R_2$ each represent an alkyl radical containing 1 to 4 carbon atoms, and X, Y, and Z each represent an alkoxy radical containing 1 to 4 carbon atoms, chlorine or hydrogen, or two of these radicals together represent low molecular alkylene dioxy, and in which at least one of the radicals X, Y, and Z represents an alkoxy radical or a chlorine atom.

As functional acid derivatives of nicotinic acid, there may be used in particular the acid halides, preferably the acid chloride or the acid bromide, the acid azide and the acid esters, especially the nicotinic acid esters of lower aliphatic alcohols such as methanol, ethanol, propanol, butanol and benzylalcohol. Hydrohalic salts of the nicotinic acid halides such as the hydrochloride of the nicotinic acid chloride and the hydrobromide of nicotinic acid bromide may also be used with advantage. It is also possible to use such salts of the nicotinic acid or of the other above-mentioned derivatives.

As functional acid derivatives, there may also be used mixed acid anhydrides of the nicotinic acid which may be obtained, for example, by reacting nicotinic acid with chloroformic acid ester in the presence of, for example, triethylamine or tributylamine.

As amine components, there may be used phenyl-ethyl-amines of the above formula, in which $R_1$ and $R_2$ each represent an alkyl radical having preferably 1 to 4 carbon atoms such as methyl, ethyl, propyl, butyl, and the phenyl radical is substituted at least by one alkoxy group, in particular a methoxy, ethoxy, propoxy or butoxy group, or by a chlorine atom. According to the definition given above, ethylamines are used in the process of the present invention which carry at the β-carbon atom a mono-alkoxyphenyl, dialkoxyphenyl, trialkoxyphenyl, mono-chlorophenyl, dichlorophenyl, trichlorophenyl, monoalkoxy-monochlorophenyl, monoalkoxy-dichlorophenyl, or a dialkoxy-monochlorophenyl radical.

As amines, there are mentioned by way of example:

2-(2′-methoxy-phenyl)-2-ethyl-butylamine-(1)
2-(3′-methoxy-phenyl)-2-ethyl-butylamine-(1)
2-(4′-methoxy-phenyl)-2-ethyl-butylamine-(1)
2-(4′-methoxy-phenyl)-2-propyl-pentylamine-(1)
2-(2′-chloro-phenyl)-2-methyl-propylamine-(1)
2-(3′-chloro-phenyl)-2-methyl-propylamine-(1)
2-(3′-chloro-phenyl)-2-ethyl-butylamine-(1)
2-(4′-chloro-phenyl)-2-ethyl-butylamine-(1)
2-(3′-chloro-phenyl)-2-butyl-hexylamine-(1)
2-(3′,4′-dimethoxy-phenyl)-2-ethyl-butylamine-(1)
2-(3′,4′-dimethoxy-phenyl)-2-propyl-pentylamine-(1)
2-(3′,4′-dimethoxy-phenyl)-2-butyl-hexylamine-(1)
2-(3′,4′-methylene-dioxy-phenyl)-2-methyl-propylamine-(1)
2-(3′,4′-dichloro-phenyl)-2-methyl-propylamine-(1)
2-(2′-chloro-3′-methoxy-phenyl)-2-ethyl-butylamine-(1)
2-(3′-methoxy-4′-chloro-phenyl)-2-propyl-pentylamine-(1)
2-(3′-chloro-4′,5′-dimethoxy-phenyl)-2-methyl-propylamine-(1)
2-(3′,4′-methylenedioxy-phenyl)-2-ethyl-butylamine-(1)
2-(3′,4′-methylenedioxy-phenyl)-2-propyl-pentylamine-(1)
2-(3′,4′-methylenedioxy-phenyl)-2-butyl-hexylamine-(1)
2-(3,4,5-trimethoxy-phenyl)-2-ethyl-butylamine-(1)

The phenylethylamines used in the present invention may be prepared, for example, by reacting the corresponding benzyl cyanides, which are substituted in the nucleus with alkyl halides in the presence of alkali amides and subsequently hydrogenating the acetonitrile derivatives thus obtained, according to the following reaction scheme which illustrates by way of example the formation of 2-(3′-methoxy-phenyl)-2-ethyl-butylamine-(1).

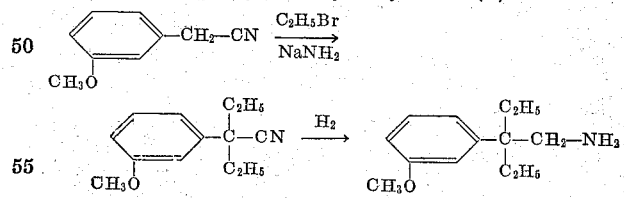

If nicotinic acid is used as starting substance, the process of the present invention is carried out advantageously by heating the nicotinic acid in a high-boiling solvent, for example, o-dichlorobenzene or nitrobenzene, with one of the above-mentioned amines and removing by distillation or with the aid of a water separator the water formed during the reaction. In order to isolate the reaction product, the solvent is removed under reduced pressure and the residue is recrystallized in a suitable solvent or subjected to distillation under reduced pressure. The conversion of the azide into the acid amides of the present invention is advantageously carried out by heating it with a corresponding amine in an inert solvent such as benzene or toluene. If nicotinic acid esters are used, the reaction with the amines can be carried out, for example, by heating to a temperature in the range of about 150° C. and 250° C. or by heating in a high-boiling solvent such as o-dichlorobenzene or nitrobenzene.

If nicotinic acid halides are used as the starting substances, heating is generally not required. Owing to the higher reactivity, the reaction proceeds spontaneously at room temperature or at temperatures below room temperature. In order to prevent too violent a course of reaction, in particular with larger batches, it is advantageous to cool first and, after the reaction has decayed, to complete it by heating on the steam bath. However, it is also possible to control the speed of the reaction by the rate of the addition of one reaction component and to renounce cooling. Since hydrogen halide is set free during the reaction, it is advantageous to operate in the presence of acid-binding agents.

As such acid binders there may be used especially organic bases such as pyridine, quinoline or triethylamine; however, an excess of the amine used as reaction component may also be used as acid-binding agent. The addition of an inert solvent such as benzene, toluene, xylene, acetone, or ether, is possible but not necessary. The concurrent use of acid-binding agents is recommended even in cases where hydrohalic salts of the nicotinic acid or of the derivatives of nicotinic acid are used as the starting substances, because one equivalent of the amine used would be excluded from the desired reaction by salt formation.

The compounds obtained according to the present invention which correspond to the formula

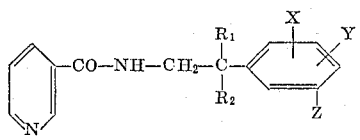

in which $R_1$, $R_2$, X, Y, and Z have the meaning already given above, constitute valuable medicaments which are distinguished by a strong sedative and neuroleptic action. For measuring this action, quantitative motility tests were carried out in white mice according to the method by Ther (Südd. Apoth. Zeitg., page 292 (1953)). Nicotinic acid - 2 - (3',4'-methylenedioxy-phenyl) - 2 - ethyl-butylamide-(1), obtained according to the present invention, was administered perorally in quantities of 25, 50 and 100 mg./kg. of mouse body weight to several groups of mice and its action was compared with that of the known methyl-propyl-propanediol-dicarbamate (meprobamate) applied to mice in quantities of 50, 100, and 200 mg./kg. of mouse. The tests were repeated 8 to 16 times and the reduction of the motility was computed in percents referred to the motility of untreated animals. The individual doses obtained showed nicotinic acid-2-(3',4'-methylenedioxy-phenyl)-2-ethyl-butylamide-(1) to have about twice the action of the known methyl-propyl-propanediol-dicarbamate.

The test for neuroleptic action was carried out in gold hamsters in accordance with the method by Ther, Vogel and Werner (Arzneimittelforschung 9, 351 (1959)) which permits differentiation between sedatives and tranquilizers, on the one hand, and neuroleptic agents on the other hand, and which furthermore permits quantitative determination of the degree of activity of such a compound. Sedatives or tranquilizers suppress the innate defense behaviour of gold hamsters (taming effect) to the same degree. In contradistinction thereto, for neuroleptic agents to produce inhibition of the postural and holding reflexes they must be administered in a multiple of the taming dose.

Quantitative plotting of the taming effect and of the coordination disturbances in a logarithmic probability network permits determination of an $ED_{50}$ for both phenomena. The relation of both doses is expressed by the neuroleptic breadth (Arzneimittelforschung 10, 806 (1960)). A neuroleptic breadth of 1:1 to 1:2 classifies the substance under the tranquilizers, whereas values over 1:5 distinguish it as neuroleptic agents.

The following table shows the effects of nicotinic acid-2-(3',4' - methylene-dioxy-phenyl) - 2-ethyl-butylamide-(1) applied perorally to gold hamsters. As results from the table, groups of 6 and 24 animals, respectively, were tested.

| Quantity applied in mg./kg. of gold hamster | 50 | 75 | 100 | 200 | 300 |
|---|---|---|---|---|---|
| Taming effect | 0/6 | 4/6 | 21/24 | 6/6 | 6/6 |
| Coordination disturbances | 0/6 | 0/6 | 0/24 | 1/6 | 5/6 |

The $ED_{50}$ of the taming activity is thus approximately at 60 mg./kg., perorally applied, the $ED_{50}$ of the coordination disturbances at about 250 mg./kg., applied perorally. For the known meprobamate, the $ED_{50}$ is in both cases 200 mg./kg. Thus, in the gold hamster test, nicotinic acid-2-(3',4'-methylenedioxy-phenyl) - 2-ethyl-butylamide-(1) has more than three times the action of the known meprobamate. The compound prepared in accordance with the present invention has, as results from the indicated data, a neuroleptic breadth of about 1:4 and its action ranges between that of a tranquilizer and that of neuroleptic agent.

As medicinal application forms, there enter into consideration, for example, capsules, dragées or emulsions, but preferably tablets, which contain the usual auxiliary and carrier substances such as talcum, starch, lactose, tragacanth, magnesium stearate, in addition to the products of the present invention which are applied in quantities ranging from 100 to 300 mg. per dosage unit.

The following examples illustrate the invention but they are not intended to limit it thereto:

*Example 1.—Nicotinic acid-2-(3'-methoxy-phenyl)-2-ethyl-butylamide-(1)*

41.4 g. of 2-(3-methoxy-phenyl)-2-ethyl-butylamine-(1) were heated for 5 hours to the boiling temperature with 24.6 g. of nicotinic acid in 80 cc. of o-dichlorobenzene, the water formed being simultaneously removed by distillation. The o-dichlorobenzene was then completely distilled off under reduced pressure and the residue in the flask was recrystallized in 30 cc. of alcohol. 61 g. of nicotinic acid-2-(3'-methoxy-phenyl)-2-ethyl-butyl-amide-(1) having a melting point of 101° C. to 102° C. were obtained.

2-(3' - methoxy-phenyl)-2-ethyl - butylamine-(1) (boiling point 145° C. to 152° C. under a pressure of 10 mm. Hg) which served as the starting substance was obtained by hydrogenation of (3-methoxy-phenyl)-diethylacetonitrile (boiling point 128° C. to 130° C. under a pressure of 4 mm. Hg) formed by the reaction of 3-methoxybenzyl-cyanide with 2 mols of ethyl bromide in the presence of 2 mols of sodium amide.

*Example 2.—Nicotinic acid-2-(3'-methoxy-phenyl)-2-ethyl-butylamide-(1)*

100 g. of nicotinic acid chloride-hydrochloride (crude product) were added, while cooling with ice and shaking, to a solution of 82.2 g. of 2-(3'methoxy-phenyl)-2-ethyl-butylamine-(1) in 280 cc. of pyridine. The whole was then heated for one hour on the steam bath. After having diluted with 2.5 litres of water and allowed to stand over night, there were obtained on trituration 113 g. of a crude product which, after recrystallization in 300 cc. of alcohol with 20 g. of charcoal, gave nicotinic acid-2-(3'-methoxyl-phenyl)-2-ethyl-butyl-amide-(1) having a melting point of 102° C.

*Example 3.—Nicotinic acid-2-(4'-methoxy-phenyl)-2-ethyl-butylamide-(1)*

31.0 g. of 2-(4'-methoxy-phenyl)-2-ethyl-butylamine-(1) were dissolved in 75 cc. of pyridine; to the whole were added, while shaking, 54 g. of nicotinic acid chloride-hydrochloride (crude product). The whole was then heated for one hour on the steam bath. 1 liter of water was added to the reaction product, the oil that had separated out was taken up in 500 cc. of benzene and extracted twice by shaking with 500 cc. of water. After drying over potash, the solvent was removed by distillation and the residue was distilled under strongly reduced pressure. There were obtained 13 g. of a crude product whose boiling point ranged from 210° C. to 222° C. under a pressure of 0.01 mm. Hg, which, after recrystallization from cyclohexane, gave nicotinic acid-2-(4'-methoxy-phenyl) - 2-ethyl-butylamide-(1) melting at 76° C.

2-(4'-methoxy-phenyl)-2-ethyl-butylamine-(1) (boiling point 152° C. to 156° C. under a pressure of 10 mm. Hg) which served as the starting substance was obtained by the hydrogenation of (4-methoxy-phenyl)-diethyl-acetonitrile (boiling point 170° C. to 175° C. at a pressure of 20 mm. Hg) which was formed by the reaction of 4-methoxy-benzylcyanide with 2 mols of ethyl bromide in the presence of 2 mols of sodium amide.

*Example 4.—Nicotinic acid-2-(4'-methoxy-phenyl)-2-propyl-pentylamide-(1)*

35.6 g. of nicotinic acid chloride-hydrochloride (crude product) were introduced, while shaking, into a solution of 35.2 g. of 2-(4'-methoxy-phenyl)-2-propyl-pentyl-amine-(1) in 75 cc. of pyridine. During the addition the temperature rose to 50° C. The whole was further heated for 2 hours on the steam bath and diluted with 1 liter of water, whereupon an oil separated. After having decanted the aqueous phase, the oil was washed with 1 liter of water, decanted and washed again with 1 liter of water. After having allowed to stand over night, 40 g. of a solid crude product were obtained which after two recrystallizations from isopropanol with charcoal gave nicotinic acid-2-(4'-methoxy-phenyl) - 2 - propyl-pentyl-amide-(1) melting at 112° C.

2-(4'-methoxy-phenyl) - 2 - propyl-pentylamine - (1) (boiling point 180° C. to 190° C. under a pressure of 16 mm. Hg) which served as the starting material was obtained by hydrogenation of (4-methoxy-phenyl)-dipropyl-acetonitrile (boiling point 185° C. to 198° C. under a pressure of 21 mm. Hg) which was formed by the reaction of 4-methoxy-benzyl-cyanide with 2 mols of propyl bromide in the presence of 2 mols of sodium amide.

*Example 5.—Nicotinic acid-2-(3'-chloro-phenyl)-2-methyl-propylamide-(1)*

53.4 g. of nicotinic acid chloride-hydrochloride were added, while shaking, to a solution of 36.8 g. of 2-(3'-chlorophenyl)-2-methyl-propyl-amine-(1) in 100 cc. of pyridine. The whole was heated for one hour on the steam bath and 2 liters of water were added. After trituration, there were obtained 43 g. of a crude product which after recrystallization from 90 cc. of a mixture of benzene and cyclohexane (1:1) gave nicotinic acid-2-(3'-chlorophenyl)-2-methyl-propyl-amide-(1) having a melting point of 89° C.

2-(3'-chloro-phenyl)-2-methyl-propylamine - (1) (boiling at 98° C. to 100° C. under a pressure of 2.6 mm. Hg) which served as the starting substance was obtained by hydrogenation of (3' - chloro - phenyl)-dimethyl - acetonitrile (boiling point at a pressure of 1.4 mm. Hg=102° C. to 108° C.) which was formed by the reaction of 3'-chlorobenzylcyanide with 2 mols of methyl iodide in the presence of 2 mols sodium amide.

*Example 6.—Nicotinic acid-2-(3'-chloro-phenyl)-2-ethyl-butylamide-(1)*

127.2 g. of 2-(3'-chloro-phenyl)-2-ethyl-butylamine-(1) were dissolved in 300 cc. of pyridine and 152.4 cc. of nicotinic acid chloride-hydrochloride (crude product) were added to the solution, while shaking. After heating for one hour on the steam bath, 2 liters of water were added to the reaction product. After having allowed to stand over night, 120 g. of a crude product were obtained which after two recrystallizations from alcohol gave nicotinic acid - 2 - (3'-chloro-phenyl)-2-ethyl-butylamide-(1) melting at 98° C.

2-(3'-chloro-phenyl)-2-ethyl-butylamine - (1) (boiling point 136° C. to 139° C. under a pressure of 5 mm. Hg) which served as the starting substance was obtained by the hydrogenation of (3'-chlorophenyl)-diethyl-acetonitrile (boiling point 104° C. to 107° C. under a pressure of 0.1 mm. Hg) which was formed by the reaction of 2'-chloro-benzyl-cyanide with 2 mols of ethyl bromide in the presence of 2 mols of sodium amide.

*Example 7.—Nicotinic acid-2-(4'-chloro-phenyl)-2-butyl-hexylamide-(1)*

75 g. of nicotinic acid chloride-hydrochloride were added, while shaking, to a solution of 80 g. of 2-(3'-chloro-phenyl)-2-butyl-hexyl-amine-(1) in 180 cc. of pyridine. The batch was then heated for one hour on the steam bath and diluted with 1.5 liters of water. After having allowed to stand over night, 107 g. of a crude product were obtained which after recrystallization from cyclohexanone gave nicotinic acid-2-(3'-chloro-phenyl)-2-butyl-hexylamide-(1) melting at 95° C. to 96° C.

2-(3'-chloro-phenyl)-2-butyl-hexylamine - (1) (boiling point=150° C. to 156° C. under a pressure of 2 mm. Hg) which served as the starting material, was obtained by hydrogenating (3' - chlorophenyl) - dibutylacetonitrile (boiling point 155° C. to 158° C. under a pressure of 1.5 mm. Hg) which was formed by the reaction of 3'-chloro-benzyl-cyanide with 2 mols of butyl-bromide in the presence of 2 mols of sodium amide.

*Example 8.—Nicotinic acid-2-(3',4'-dimethoxy-phenyl)-2-ethyl-butyl-amide-(1)*

72 g. of nicotinic acid chloride-hydrochloride were added slowly, while shaking, to a solution of 71.2 g. of 2-(3',4'-dimethoxyphenyl)-2-ethyl-butylamine-(1) in 100 cc. of pyridine. The whole was then heated for one hour on the steam bath and 2 liters of water were added to the reaction product. After having allowed to stand over night, 107 g. of a crude product were obtained which after recrystallization from ethylacetate gave nicotinic acid-2-(3',4'-dimethoxy-phenyl) - 2 - ethyl - butylamide-(1) melting at 90° C. The product contained ½ mol of crystal water.

2-(3',4'-dimethoxy-phenyl) - 2 - ethyl - butylamine-(1) (boiling point 135° C.–137° C. under a pressure of 1 mm. Hg) which served as the starting substance was obtained by hydrogenation of (3,4-dimethoxy-phenyl)-diethylacetonitrile (boiling point 143° C. to 145° C. under a pressure of 1 mm. Hg) which was formed by the reaction of 3,4-dimethoxy-benzyl-cyanide with 2 mols of ethyl iodide in the presence of 2 mols of sodium amide.

*Example 9.—Nicotinic acid 2-(3',4'-methylenedioxy-phenyl)-2-ethyl-butyl-amide-(1)*

26.7 g. of nicotinic acid chloride-hydrochloride were entered rapidly, while shaking, into a solution of 22.1 g. of 2-(3',4'-methylenedioxy - phenyl)-2-ethyl-butylamine-(1) in 50 cc. of pyridine, the reaction solution being thereby heated to 50° C. The batch was then heated for one hour on the steam bath, 1 liter of water was added and the whole was decanted again with 1 liter of water. After having allowed to stand over night, the crude product which had not yet completely crystallized was, without drying, recrystallized from isopropanol of 50% strength. There was obtained nicotinic acid-2-(3',4'-methylenedioxy-phenyl)-2-ethyl-butylamide-(1) in the form of colorless needles melting at 110° C. to 111° C.

2-(3',4'-methylenedioxy-phenyl) - 2 - ethyl-butylamine-(1) (boiling point 136° C. under a pressure of 1 mm. Hg) which served as the starting substance was obtained by the hydrogenation of (3,4-methylenedioxy-phenyl)-diethyl-acetonitrile (boiling point 132° C. to 135° C. under a pressure of 1 mm. Hg) which was formed by the reaction of 3,4-methylene-dioxy-benzylcyanide with 2 mols of ethyl iodide in the presence of 2 mols of sodium amide.

*Example 10.—Nicotinic acid-2-(3′,4′-methylenedioxy-phenyl)-2-propyl-pentylamide-(1)*

21.4 g. of nicotinic acid chloride-hydrochloride were introduced rapidly, while shaking, into a solution of 20 g. of 2-(3′,4′-methylenedioxy-phenyl)-2-propyl-pentylamine-(1) in 45 cc. of pyridine. The whole was subsequently heated for one hour on the steam bath. The solution was then decanted twice with 1 liter of water each. The oil obtained was recrystallized from aqueous methanol. After another recrystallization from methanol, there was obtained nicotinic acid-2-(3′,4′-methylenedioxy-phenyl)-2-propyl-pentylamide-(1) melting at 153° C. to 154° C.

2-(3′,4′-methylenedioxy-phenyl)-2-propyl-pentylamine-(1)(boiling point 156° C. to 159° C. under a pressure of 1.2 mm. Hg) which served as the starting substance was obtained by the hydrogenation of (3,4-methylene-dioxy-phenyl)-dipropyl-acetonitrile (boiling point under a pressure of 0.6 mm. Hg=135° C. to 138° C.), which was formed by the reaction of 3,4-methylenedioxy-benzylcyanide with 2 mols of ethyl bromide in the presence of 2 mols of sodium amide.

*Example 11.—Nicotinic acid-2-(3′,4′-methylenedioxy-phenyl)-2-butyl-hexylamine-(1)*

26.7 g. of nicotinic acid chloride-hydrochloride were added, while shaking, to a solution of 27.3 g. of 2-(3′,4′-methylenedioxy-phenyl)-2-butyl-hexylamine-(1) in 50 cc. of pyridine, the temperature rising thereby to 60° C. The reaction product was then heated for one hour on the steam bath and 1 liter of water was added. The oil that had separated was decanted twice with 1 liter of water each, then it was taken up in 1 liter of benzene and extracted thrice with 1 liter of water each. After drying, the benzene solution was evaporated over potash, the residue was dissolved in absolute benzene and chromatographed neutrally on aluminium oxide (according to Brockmann). The product was subsequently eluted with absolute alcohol. After evaporation of the alcohol eluate, the residue was dissolved in 40 cc. of methanol and boiled for 45 minutes with 5 g. of charcoal. There were obtained 6.2 g. of a crude product melting at 126° C. to 127° C., which after recrystallization from methanol gave nicotinic acid-2-(3′,4′-methylenedioxy-phenyl) - 2 - butyl-hexylamide-(1) melting at 127° C.–128° C.

*Example 12.—Nicotinic acid-2-(3′,4′-methylenedioxy-phenyl)-2-ethyl-butylamide-(1)*

14.1 g. of nicotinic acid chloride were added, within 5 minutes, while using a vibromixer and ice cooling, to a solution of 22.1 g. of 2-(3′,4′-methylenedioxy-phenyl)-2-ethyl-butylamine-(1) in 50 cc. of pyridine, whereupon the temperature of the reaction solution rose to 60° C. The reaction product was then heated for one hour on the steam bath and 2 liters of water were added. After vigorous trituration there formed crystals which were filtered with suction and washed with water. The crude product was taken up in 300 cc. of ethyl acetate and dried over potash. After evaporation of the solvent with the addition of 20 cc. of ethyl acetate, there were obtained colorless crystals forming 25 g. of nicotinic acid-2-(3′,4′-methylenedioxy-phenyl) - 2 - ethyl-butylamide-(1) having a melting point of 110–111° C.

*Example 13.—Nicotinic acid-2-(3′,4′-methylenedioxy-phenyl)-2-ethyl-butylamide-(1)*

A suspension of 12.3 g. of nicotinic acid in 300 cc. of warm benzene was caused to dissolve by the addition of 10.1 g. of triethylamine, the clear solution was cooled to +5° C. and 11 g. of chloroformic acid ethyl ester were added with stirring, while solid triethylamine-hydrochloride separated out. The whole was allowed to stand for one hour and then 22.1 g. of 2-(3′,4′-methylenedioxy-phenyl)-2-ethyl-butylamine-(1) were added, while stirring. The temperature rose to 35° C. while carbonic acid was being set free. After 15 hours, the triethylamine-hydrochloride that had separated was filtered off with suction and well washed with benzene. After evaporation of the benzene, the residue was dissolved in 15 cc. of ethyl acetate and 20 cc. of ether were added thereto. The crystals were suction-filtered and again recrystallized from 20 cc. of ethyl acetate. There were obtained 9 g. of nicotinic acid - 2-(3′,4′-methylenedioxy-phenyl)-2-ethyl-butylamide-(1) having a melting point in the range from 110° C. to 111° C.

*Example 14.—Nicotinic acid-2-(3′,4′-methylenedioxy-phenyl)-2-ethyl-butylamide-(1)*

14.4 g. of nicotinic acid chloride were added at +5° C. in the course of 5 minutes, while using a vibro-mixer, to a solution of 22.1 g. of 2-(3′,4′-methylenedioxy-phenyl)-2-ethyl-butylamine-(1) and 30.3 g. of triethylamine in 100 cc. of benzene, whereupon the temperature rose to about 50° C. The whole was heated for 1 hour on the steam bath, the benzene was evaporated and water was added to the residue. The crude product (30 g.) thus obtained was recrystallized from ethyl acetate after drying. 20 g. of nicotinic acid - 2-(3′,4′-methylenedioxy-phenyl)-2-ethyl-butylamide-(1) having a melting point of 110° C. to 111° C. were obtained.

We claim:

1. Substituted nicotinic acid-phenyl-ethylamides of the formula

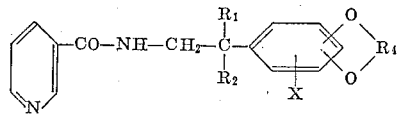

wherein $R_1$ and $R_2$ each represents an alkyl of from 1 to 4 carbon atoms, X is a member selected from the group consisting of alkoxy having from 1 to 4 carbon atoms, chlorine and hydrogen, and $R_4$ is lower alkylene.

2. Nicotinic acid - 2-(3′,4′-methylenedioxy-phenyl)-2-ethyl-butylamide-(1).

3. Nicotinic acid - 2-(3′,4′-methylenedioxy-phenyl)-2-propyl-pentylamide-(1).

4. Nicotinic acid - 2-(3′,4′-methylenedioxy-phenyl)-2-butyl-hexylamide-(1).

References Cited in the file of this patent

UNITED STATES PATENTS

| | | |
|---|---|---|
| 2,483,250 | Suter | Sept. 27, 1949 |
| 2,681,341 | Cronheim et al. | June 15, 1954 |
| 2,721,203 | Meyer | Oct. 18, 1955 |
| 2,976,213 | Murphey | Mar. 21, 1961 |
| 3,053,736 | Abood et al. | Sept. 11, 1962 |

FOREIGN PATENTS

| | | |
|---|---|---|
| 199,185 | Australia | Aug. 25, 1958 |

OTHER REFERENCES

Sugasawa et al.: Berichte, vol. 69B, pp. 2068–71 (1936).